United States Patent [19]

Chopko et al.

[11] Patent Number: 4,688,391
[45] Date of Patent: Aug. 25, 1987

[54] REFRIGERATION UNIT AND HYDRAULIC POWER SYSTEM

[75] Inventors: Robert A. Chopko, Liverpool, N.Y.; Joel W. Androff, Rowland Heights, Calif.

[73] Assignee: Carrier Corporation, Syracuse, N.Y.

[21] Appl. No.: 942,759

[22] Filed: Dec. 17, 1986

[51] Int. Cl.⁴ .................. F25D 29/00; F25B 27/00
[52] U.S. Cl. .................. 62/163; 62/228.5; 62/239; 62/323.1; 60/423
[58] Field of Search .............. 62/323.1, 323.4, 228.5, 62/196.1, 196.2, 196.3, 239, 243, 244, 133, 163; 165/42, 41, 43; 123/2; 60/431, 423; 414/545, 728; 296/56, 57 R

[56] References Cited

U.S. PATENT DOCUMENTS

| | | | |
|---|---|---|---|
| 3,236,060 | 2/1966 | Clark, Jr. ............... | 62/323.4 X |
| 4,068,477 | 1/1978 | Lefebvre ............... | 62/323.4 X |
| 4,327,558 | 5/1982 | Howland et al. ....... | 62/196.2 X |

Primary Examiner—Harry Tanner
Attorney, Agent, or Firm—David J. Zobkiw

[57] ABSTRACT

A transport refrigeration system is connected to a hydraulic system including a pump, control valves, a reservoir and a hydraulic piston. When the refrigeration system is running, the hydraulic system is in a bypassing or idling mode and the diesel and compressor are run responsive to cargo refrigeration requirements. When the hydraulic system is activated, the diesel is caused to operate at a preselected speed for maximum hydraulic flow and the refrigeration electrical system unloads the compressor to divert more engine power to the hydraulic pump.

6 Claims, 4 Drawing Figures

REFRIGERATION UNIT AND HYDRAULIC POWER SYSTEM

BACKGROUND OF THE INVENTION

Trailers with refrigeration units are typically used to ship and deliver frozen and/or perishable cargos. The refrigeration unit is generally mounted on the front outer wall of the trailer to maximize cargo space and includes a diesel engine for powering the refrigeration unit. In the loading and unloading of the cargo, a lift gate or platform is typically used to raise and lower the load. The lift gate or platform is operated through a hydraulic system conventionally powered by auxiliary batteries. The hydraulic system and batteries are mounted to the undercarriage of the trailer where there is a greater exposure to theft and road hazards such as vibrational stress and road spray of dirt and salt. Where the cargo is made up of both frozen and perishable items, each compartment may have its own lift gate or platform.

SUMMARY OF THE INVENTION

A hydraulic power system is directly driven by the diesel engine driving the compressor of the refrigeration unit and means are provided so that the compressor is always unloaded when the hydraulic power system is activated. The hydraulic power system is attached to the framework of the refrigeration unit so as to form an integral unit therewith. The resultant unit eliminates the need for auxiliary batteries while providing a suitable power source for the hydraulic power system and permits the locating of the hydraulic power system in a location less exposed to road hazards. The refrigeration requirements of the cargo are therefore met and control the diesel power source unless there is a deliberate disabling due to the actuation of the hydraulic system.

It is an object of this invention to provide a combined refrigeration and hydraulic power system for transport trailer use;

It is another object of this invention to provide a reliable power source for a hydraulic power system. These objects and others as will become apparent hereinafter, are accomplished by the present invention.

Basically, a diesel engine is connected so as to continuously drive the compressor of the transport refrigeration unit and the pump of the hydraulic power system. Either the pump or the compressor is running in an idle or unloaded mode respectively whenever the diesel is running. Normally, the pump is running idle and the compressor is driven responsive to refrigeration requirements as the diesel engine speed is controlled responsive to system needs with the compressor being unloaded when the needs are met. When it is desired to operate the hydraulic system, a manual switch is actuated which causes the compressor to be unloaded, causing the diesel engine to run at a predetermined speed and causing the supplying of pressurized hydraulic fluid to the hydraulic cylinder operating the lift gate or platform. While the hydraulic system is powered, system pressure is controlled through a relief valve which bypasses excessive pump output back to the hydraulic reservoir. When the platform is to be lowered, the manual switch is repositioned thereby permitting the compressor to be unloaded and the diesel engine to run at a predetermined speed while gravity lowers the platform and forces the hydraulic fluid from the cylinder. The hydraulic fluid exhausting from the cylinder is returned to the reservoir and the flow rate can be controlled automatically by hydraulic flow control valves to control the rate of movement of the lift gate or platform.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
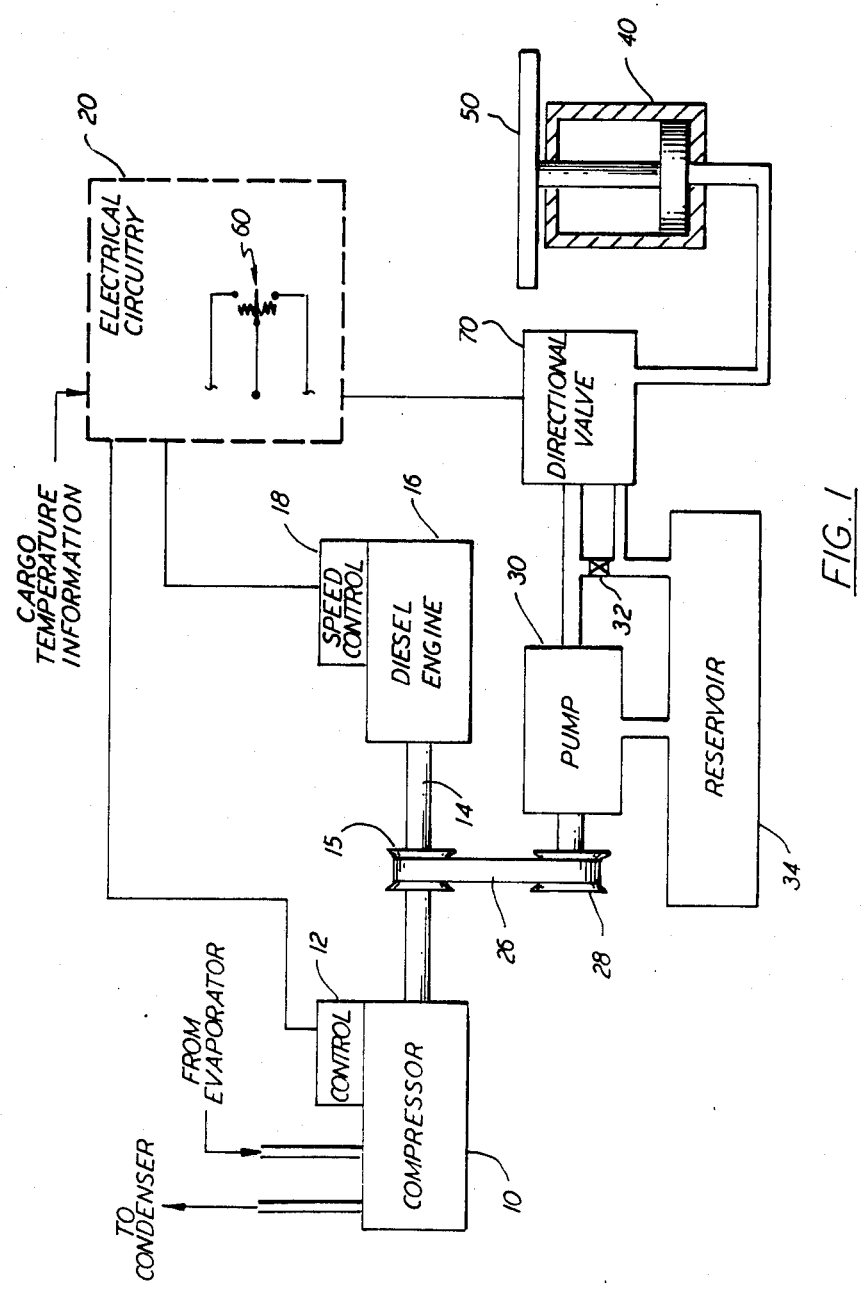
FIG. 1 is a schematic representation of a combined refrigeration and hydraulic power system.

In FIG. 1 the numeral 10 designates the compressor of a transport refrigeration system which is directly driven by diesel engine 16. The compressor 10 and diesel engine 16 are under the control of electrical circuitry 20, as is conventional, which receives temperature information from the cargo space and responsive thereto controls the diesel engine 16 via diesel engine speed control 18. Electrical circuitry 20 can include a number of known features such as the refrigeration system control details, an automatic start/stop system and the structure for switching over to line power which form no part of the present invention and therefore have been described or illustrated for reasons of clarity and brevity. Compressor 10 is driven as long as the diesel engine 16 is operating, but when temperature requirements are met in the cargo space, in addition to slowing the diesel engine 16, electrical circuitry 20 causes the unloading of compressor 10 via unloader control 12. The foregoing description generally applies to transport refrigeration units. While the cargo has very specific temperature requirements, it is possible to maintain the cargo temperature within suitable limits if the refrigeration system is only disabled for a limited period of time.

Figure 2:
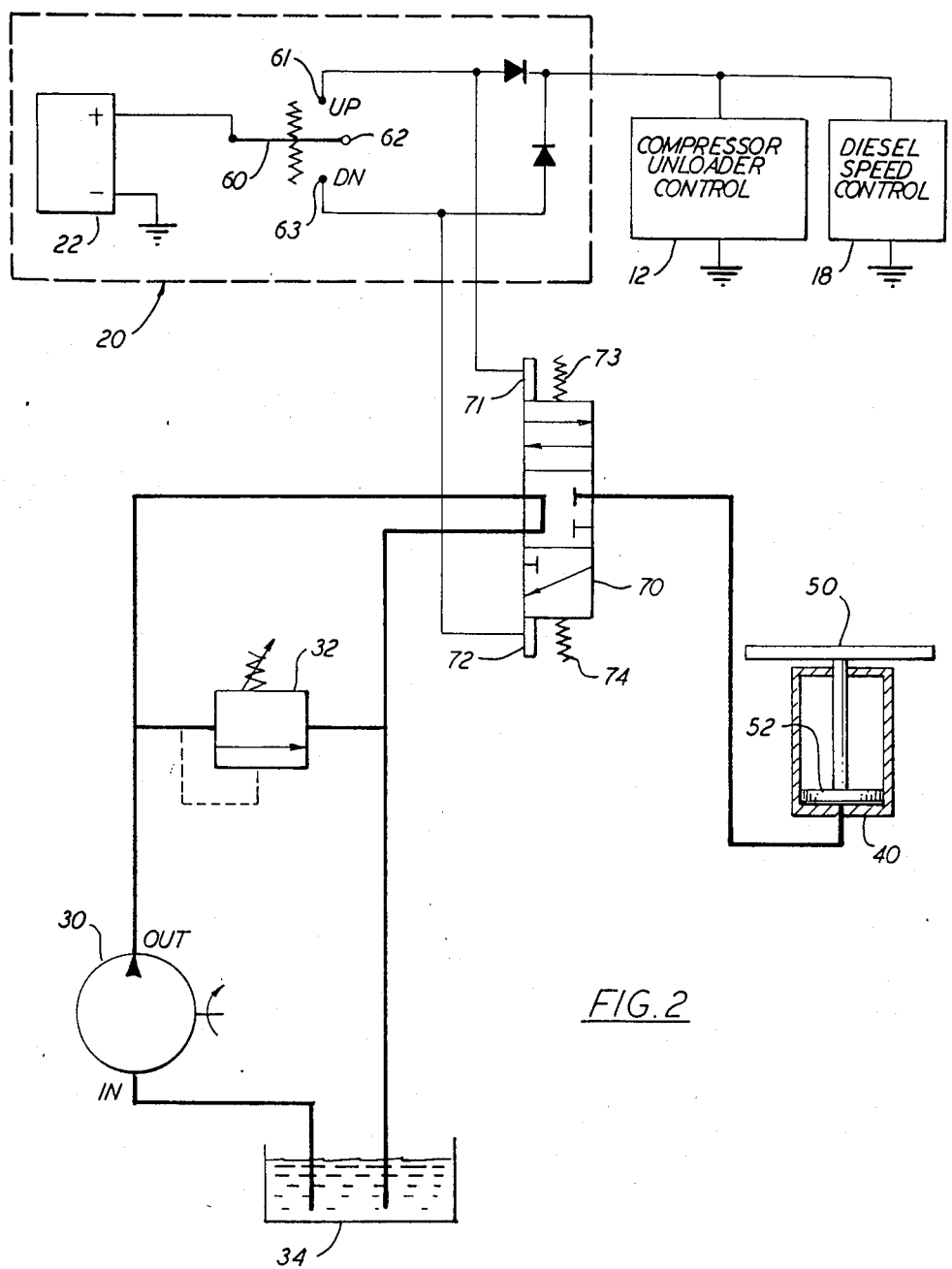
FIG. 2 is a schematic representation of the hydraulic power system in the idle mode.
Figure 3:
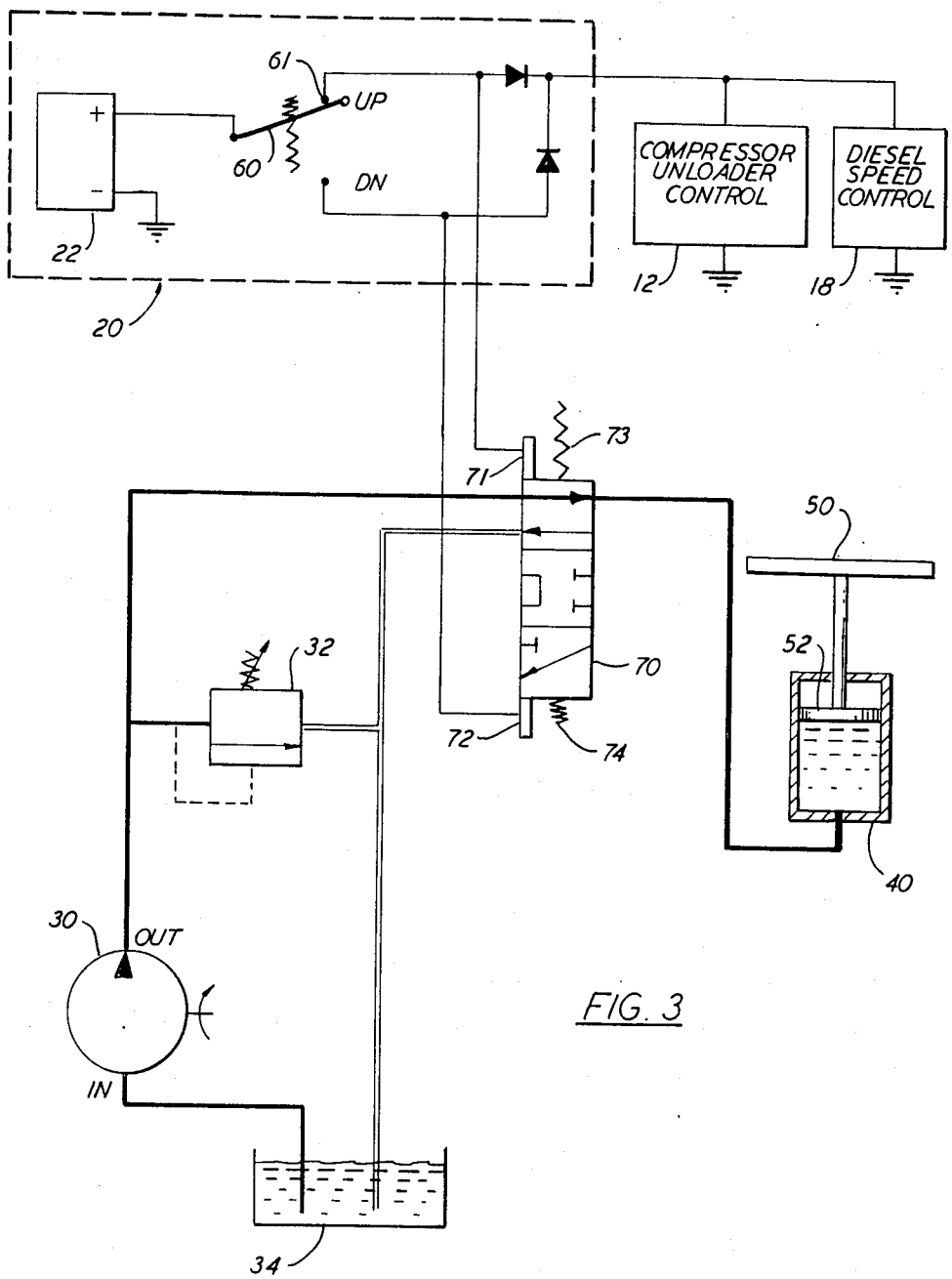
FIG. 3 is a schematic representation of the hydraulic power system in the power up mode.
Figure 4:
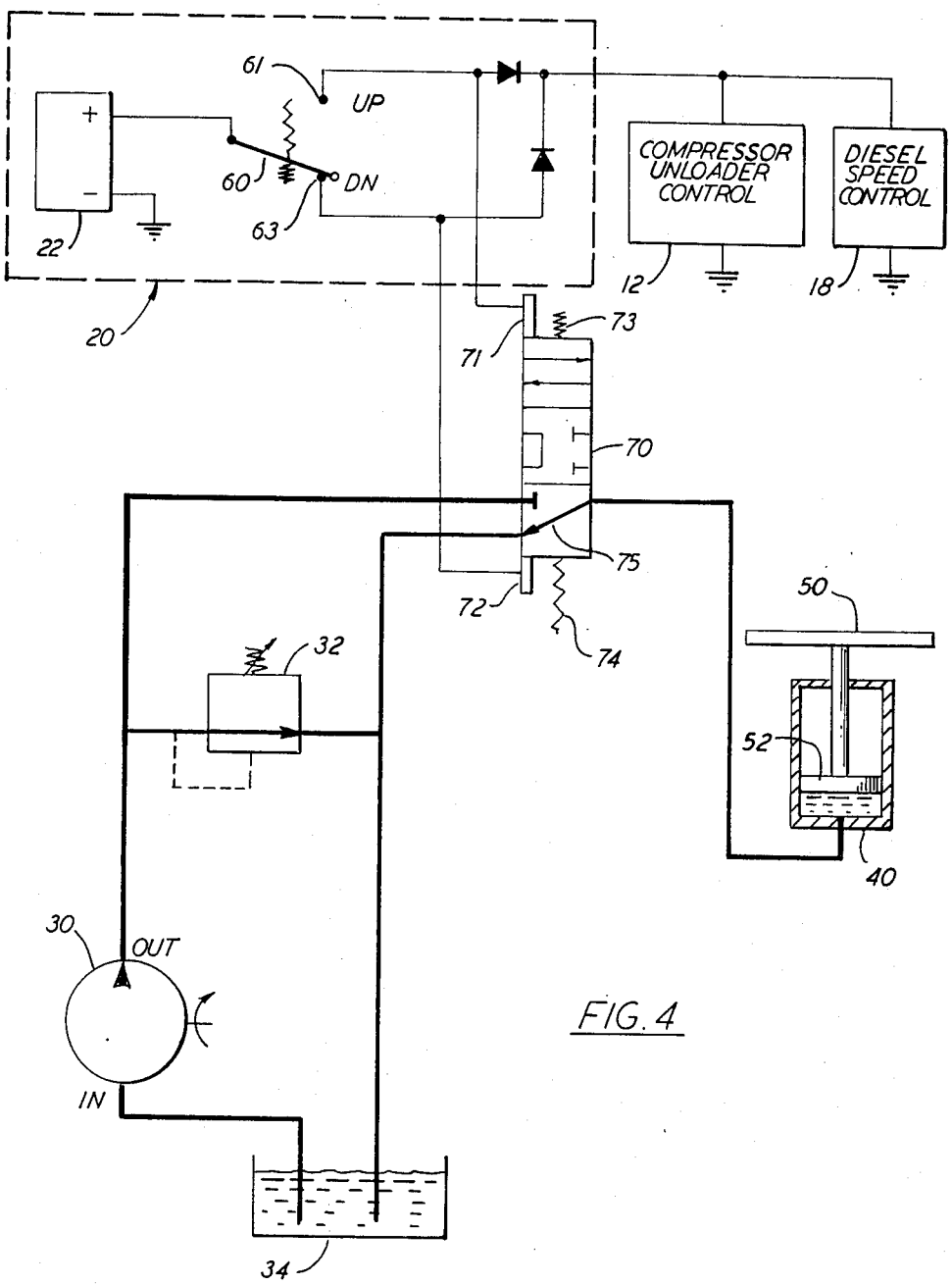
FIG. 4 is a schematic representation of the hydraulic power system in the gravity down mode.

The present invention connects hydraulic pump 30 via sheave 28 and belt 26 to the sheave 15 which is driven by shaft 14 of diesel engine 16. As a result, pump 30, like compressor 10, is driven whenever diesel engine 16 is operated. Hydraulic pump 30 provides high pressure hydraulic fluid to hydraulic cylinder 40 for raising lift gate or platform 50 under the control of electrical circuitry 20 via direction valve 70 responsive to manual switch 60. Referring now to FIGS. 2–4, it will be noted that manual switch 60 has three positions and each of them corresponds to a position of directional valve 70 and to a function of the hydraulic cylinder 40 and lift gate or platform 50. In FIG. 2, manual switch 60 is in the idle position engaging terminal or contact 62 and directional valve 70 is in its central or neutral position so that the hydraulic fluid pumped by pump 30 passes through directional valve 70 and returns to reservoir 34. Switch 60 is normally held in engagement with terminal or contact 62 due to the bias of springs 64 and 65. Other than the fact that pump 30 is being run in an unloaded fashion the refrigeration unit is run responsive to cargo requirements under the control of electrical circuitry 20.

If it is desirable to raise the gate or platform 50, manual switch 60 is moved against the bias of spring 64 into engagement with terminal or contact 61 as illustrated in FIG. 3. The operator must hold switch 60 in engagement with contact or terminal 61 otherwise springs 64 and 65 will return switch 60 to the FIG. 2 position. It will be noted that when manual switch 60 engages terminal or contact 61 a power source represented by the refrigeration system battery 22 is connected to provide power to both the diesel engine speed control 18 to cause diesel engine 16 to run at a predetermined speed and to the compressor unloader control 12 to unload compressor 10 and thereby reduce power demand on diesel engine 16 and to electric solenoid 71 of directional valve 70 to cause directional valve 70 to shift to the FIG. 3 position against the bias of center return spring 74. The high pressure hydraulic fluid supplied by pump 30 is thereby directed through directional valve 70 to hydraulic cylinder 40 where it acts on piston 52 to cause lift gate or platform 50 to be raised. When lift gate or platform 50 has been fully raised or if pump 30 is otherwise pumping hydraulic fluid in excess of requirements, high pressure relief valve 32 causes the bypassing of excess hydraulic fluid to reservoir 34. As long as manual switch 60 engages terminal or contact 61 the compressor 10 and therefore the refrigeration system will be disabled due to the unloading of compressor 10 by compressor unloader control 12. When manual switch 60 is allowed to return to the idle position (FIG. 2) while lift gate or platform 50 is raised, the hydraulic fluid is trapped between directional valve 70 and hydraulic cylinder 40, thus allowing lift gate or platform 50 to remain in its raised position indefinitely while compressor 10 is once again responsive to cargo refrigeration requirements.

When the lift gate or platform 50 is to be lowered, manual switch 60 is moved against the bias of spring 65 into engagement with contact or terminal 63 to provide power to electric solenoid 72 to cause directional valve 70 to shift to the FIG. 4 position against the bias of center return spring 73. The operator must hold switch 60 in engagement with contact or terminal 63 otherwise springs 64 and 65 will return switch 60 to the FIG. 2 position. With manual switch 60 engaging terminal 63, compressor unloader control 12 and diesel engine speed control 18 are again provided power to unload the compressor 10 and to cause diesel engine 16 to run at a predetermined speed. The output of pump 30 is blocked by directional valve 70 and high pressure relief valve 32 bypasses the output of pump 30 back to reservoir 34. Hydraulic cylinder 40 is connected to reservoir 34 through a passage 75 in directional valve 70 which causes the lowering of lift gate or platform 50 to take place at a controlled rate. Passage 75 may be restricted to regulate the lowering rate of lift gate or platform 50, but conventional hydraulic flow control valves would normally control the flow from cylinder 40, above, or in combination with restricted passage 75. If, during lowering or raising, lift gate or platform 50 is required to stop at any intermediate position, manual switch 60 is allowed to engage terminal or contact 62, the FIG. 2 position, whenever the platform 50 reaches the desired elevation. This would permit the compressor 10 to be again controlled responsive to cargo refrigeration requirements.

From the foregoing description, it should be clear that the present invention integrates a hydraulic system into a transport refrigeration unit and thereby eliminates the need for an auxiliary power source. Further, the compressor unloader control and the diesel engine speed control are connected to the hydraulic system such that when the hydraulic system is actuated, the compressor is unloaded and the diesel engine speed is at a predetermined level to provide maximum hydraulic fluid rather than being responsive to cargo refrigeration needs.

Although a preferred embodiment of the present invention has been illustrated and described, other modifications will occur to those skilled in the art. For example, although the present invention has been described in terms of a diesel powered system, it is equally applicable to a dual powered unit when operating on line power where the compressor is unloaded to permit power to be supplied to the hydraulic system just as when operating under diesel power. It is therefore intended that the present invention is to be limited only by the scope of the appended claims.

What is claimed is:

1. A refrigeration unit and hydraulic power system comprising:
    diesel engine means including speed control means;
    compressor means connected to said diesel engine means so as to be continuously driven thereby and including unloading means;
    hydraulic pump means having an inlet and an outlet and connected to said diesel engine means so as to be continuously driven thereby:
    a reservoir containing hydraulic fluid connected to said inlet for supplying hydraulic fluid to said pump means:
    platform means:
    hydraulic cylinder means for raising and lowering said platform means;
    three position valve means having a first port connected to said outlet, a second port connected to said cylinder means and a third port connected to said reservoir;
    electrical circuitry connected to said unloading means, said speed control means and said directional valve means and including a switch means having a first position in which said valve means is in a first position which connects said first and third ports whereby the output of said pump is bypassed to said reservoir and said compressor means and said diesel engine means are operated by said electrical circuitry responsive to cargo temperature requirements, said switch means having a second position in which said valve means is in a second position which connects said first and second ports whereby hydraulic fluid is supplied to said cylinder means for raising said platform means and said unloading means unloads said compressor means and said speed control means operates said diesel means at a predetermined speed, and said switch means having a third position in which said valve means is in a third position which connects said second and third ports whereby said cylinder means is connected to said reservoir for lowering said platform means and said unloading means unloads said compressor means and said speed control means operates said diesel means at a predetermined speed.

2. The refrigeration unit and hydraulic power system of claim 1 wherein said third position of said valve means provides a restricted communication between said second and third ports so as to limit the rate at which said platform means is lowered.

3. The refrigeration unit and hydraulic power system of claim 1 wherein said outlet of said pump means is connected to said reservoir via a high pressure relief valve means.

4. A refrigeration unit and hydraulic power system comprising:
   driving means including speed control means;
   compressor means connected to said driving means so as to be continuously driven thereby and including unloading means;
   hydraulic pump means having an inlet and an outlet and connected to said driving means so as to be continuously driven thereby:
   a reservoir containing hydraulic fluid connected to said inlet for supplying hydraulic fluid to said pump means;
   platform means:
   hydraulic cylinder means for raising and lowering said platform means;
   three position valve means having a first port connected to said outlet, a second port connected to said cylinder means and a third port connected to said reservoir;
   electrical circuitry connected to said unloading means, said speed control means and said directional valve means and including a switch means having a first position in which said valve means is in a first position which connects said first and third ports whereby the output of said pump is bypassed to said reservoir and said compressor means and said driving means are operated by said electrical circuitry responsive to cargo temperature requirements, said switch means having a second position in which said valve means is in a second position which connects said first and second ports whereby hydraulic fluid is supplied to said cylinder means for raising said platform means and said unloading means unloads said compressor means and said speed control means operates said driving means at a predetermined speed, and said switch means having a third position in which said valve means is in a third position which connects said second and third ports whereby said cylinder means is connected to said reservoir for lowering said platform means and said unloading means unloads said compressor means and said speed control means operates said diesel means at a predetermined speed..

5. The refrigeration unit and hydraulic power system of claim 4 wherein said third position of said valve means provides a restricted communication between said second and third ports so as to limit the rate at which said platform means is lowered.

6. The refrigeration unit and hydraulic power system of claim 4 wherein said outlet of said pump is connected to said reservoir via a high pressure relief valve means.

* * * * *